(12) United States Patent
Lee et al.

(10) Patent No.: US 11,335,274 B2
(45) Date of Patent: May 17, 2022

(54) SOURCE DRIVER AND DISPLAY DEVICE HAVING TEMPERATURE SENSOR

(71) Applicant: SILICON WORKS CO., LTD., Daejeon (KR)

(72) Inventors: Jeong Lee, Daejeon (KR); Kyung Min Shin, Daejeon (KR); Yong Sung Ahn, Daejeon (KR); Gi Woong Shin, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 16 days.

(21) Appl. No.: 17/020,070

(22) Filed: Sep. 14, 2020

(65) Prior Publication Data
US 2021/0082352 A1 Mar. 18, 2021

(30) Foreign Application Priority Data
Sep. 16, 2019 (KR) .................. 10-2019-0113249

(51) Int. Cl.
*G09G 3/3291* (2016.01)
*G01K 7/01* (2006.01)
*G01K 19/00* (2006.01)

(52) U.S. Cl.
CPC .......... *G09G 3/3291* (2013.01); *G01K 7/01* (2013.01); *G01K 19/00* (2013.01); *G09G 2310/0297* (2013.01); *G09G 2310/08* (2013.01); *G09G 2320/0693* (2013.01); *G09G 2330/023* (2013.01)

(58) Field of Classification Search
CPC ..... G09G 2320/041; G09G 2320/0238; G09G 2320/0285; G09G 2320/0233; G09G 2320/043; G09G 2320/0626; G09G 2300/0491; G09G 2310/027; G09G 3/32; G09G 3/3233; G09G 5/10; G01K 15/005; G01K 15/007; G01K 13/00; G01K 7/01; G01K 7/16; G01K 7/21; G01K 1/026
See application file for complete search history.

(56) References Cited

U.S. PATENT DOCUMENTS

| | | | |
|---|---|---|---|
| 7,891,869 B2 | 2/2011 | Takeuchi | |
| 9,483,034 B2 | 11/2016 | Soenen et al. | |
| 2006/0267972 A1* | 11/2006 | Yi | G09G 3/3648 345/211 |
| 2012/0281008 A1* | 11/2012 | Marcu | G09G 3/006 345/589 |
| 2013/0136149 A1* | 5/2013 | Soenen | H03M 3/344 374/1 |
| 2014/0161149 A1* | 6/2014 | Susak | G01K 7/01 374/1 |
| 2015/0063403 A1* | 3/2015 | Cho | G01K 15/005 374/1 |
| 2016/0033340 A1* | 2/2016 | Todd | G01K 15/005 374/1 |
| 2018/0066998 A1* | 3/2018 | Merrikh | G01K 1/20 |

(Continued)

FOREIGN PATENT DOCUMENTS

JP 3432920 B2 8/2003

*Primary Examiner* — Dong Hui Liang
(74) *Attorney, Agent, or Firm* — Fenwick & West LLP

(57) ABSTRACT

An embodiment relates to a temperature sensor having a correction function and is able to reduce errors in measurement by the temperature sensor by calibrating a correlation between temperature and voltage.

16 Claims, 13 Drawing Sheets

(56) References Cited

U.S. PATENT DOCUMENTS

2018/0096661 A1* 4/2018 Zhao .................. G09G 5/001
2018/0261144 A1* 9/2018 Lin .................... G09G 3/3688
2021/0350731 A1* 11/2021 Tsai ................... G09G 3/006

* cited by examiner

121

|         | Temperature[°C] |     |     |     |     |     |     |     |
| ------- | --- | --- | --- | --- | --- | --- | --- | --- |
| Chamber | -20 | 0   | 10  | 20  | 30  | 40  | 50  | 90  |
| Sample 1 | -20 | 1  | 10  | 20  | 29  | 39  | 49  | 89  |
| Sample 2 | -19 | 1  | 10  | 20  | 30  | 39  | 49  | 89  |

SOURCE DRIVER AND DISPLAY DEVICE HAVING TEMPERATURE SENSOR

CROSS REFERENCE TO RELATED APPLICATION

This application claims priority from Republic of Korea Patent Application No. 10-2019-0113249, filed on Sep. 16, 2019, which is hereby incorporated by reference in its entirety.

BACKGROUND

1. Field of Technology

The present embodiment relates to a temperature sensor having a correction function, and further relates to a source driver and a display device including the same.

2. Description of the Prior Art

A temperature sensor detects ambient heat and is widely used in semiconductor integrated circuits. In particular, the temperature sensor may detect the temperature of a heat-sensitive component in a display device, and a panel driving device may appropriately control the voltage or current supplied to the component depending on the detected temperature.

The temperature sensor may detect the temperature using electrical characteristics that change with heat. The temperature sensor may output electrical characteristics such as current, which changes depending on temperature, and may calculate temperature from the electrical characteristics. However, there may be discrepancies between the actual temperature and the temperature output by the temperature sensor.

Various techniques for correcting the above errors have been developed. In order to correct the errors, temperature data may be corrected in the analog stage, but this has the disadvantage of requiring a complicated circuit for correction. In addition, if the temperature sensor calculates a temperature through the nonlinear characteristics of a voltage, a discrepancy may occur between the calculated temperature and the actual temperature.

Meanwhile, the temperature sensor may introduce errors due to several factors. For example, the ground voltage of the temperature sensor may fluctuate, so the voltage output through sensing by the temperature sensor may differ. Alternatively, if a source driver of a display device performs an operation consuming a large amount of power, the internal temperature becomes higher than the actual temperature thereof, and the temperature sensor mounted inside the source driver may sense a temperature different from the actual temperature.

Therefore, it is necessary to develop technology for correcting the temperature sensor that is capable of solving the problem with the existing error correction of the temperature sensor and takes into consideration the amount of heat emitted due to power consumption.

SUMMARY

An aspect of the present embodiment is to provide a technique for correcting a measurement error of a temperature sensor by calibrating a correlation between temperature and voltage. Another aspect of the present embodiment is to provide a temperature correction technique that differs depending on the power consumption of a source driver. Another aspect of the present embodiment is to provide a technique for a source driver that measures the temperature of a panel using thermal conductivity.

To this end, an aspect of the present disclosure provides a source driver comprising: a calibrating circuit configured to differently obtain multiple pieces of temperature data and multiple pieces of voltage data corresponding to the multiple pieces of temperature data according to modes depending on power consumption of the source driver, and to generate a function between temperature and voltage from the obtained multiple pieces of temperature data and the obtained multiple pieces of voltage data; and a data calculating circuit configured to receive input voltage data and apply the input voltage data to the function, thereby calculating temperature data corresponding to the input voltage data.

In the source driver, the modes may comprise a first mode for a first power consumption and a second mode for a second power consumption lower than the first power consumption, and the source driver may further comprise a memory configured to store a first group of multiple pieces of temperature data and a first group of multiple pieces of voltage data according to the first mode, and a second group of multiple pieces of temperature data and a second group of multiple pieces of voltage data according to the second mode.

In the source driver, the calibrating circuit may read out a plurality of pieces of temperature data and a plurality of pieces of voltage data from the memory according to the modes, and generate the function from the plurality of pieces of read temperature data and the plurality of pieces of read voltage data.

In the source driver, the power consumption may be determined by a refresh rate (RR) of a panel.

The source driver may further comprise a memory configured to store offset data, and the calibrating circuit may generate the function from data obtained by reflecting the offset data to the plurality of pieces of voltage data.

In the source driver, the calibrating circuit may comprise a multiplexer (MUX) configured to select the plurality of pieces of voltage data or the offset data.

The source driver may further comprise a temperature sensor configured to generate signals corresponding to the plurality of pieces of voltage data and the input voltage data.

Another aspect of the present disclosure provides a display device comprising: a panel; and a source driver, coupled to one surface of the panel, configured to receive heat from the panel while being coupled to one surface of the panel, to obtain first temperature data, first voltage data corresponding to the first temperature data, second temperature data, and second voltage data corresponding to the second temperature data, to generate a function between temperatures and voltages from the first temperature data, the first voltage data, the second temperature data, and the second voltage data, to receive third voltage data, and to calculate third temperature data corresponding to the third voltage data by applying the third voltage data to the function.

The display device may further comprise a heat sink plate positioned between the panel and the source driver so as to transfer heat from the panel to the source driver.

In the display device, the third temperature data is a temperature of the panel.

Still another aspect of the present disclosure provides a source driver comprising: a calibrating circuit configured to obtain first temperature data, first voltage data corresponding to the first temperature data, second temperature data, and second voltage data corresponding to the second temperature data, and to generate a function between temperatures and voltages from the first temperature data, the first voltage data, the second temperature data, and the second voltage data; and a data calculating circuit configured to receive third voltage data and calculate third temperature data corresponding to the third voltage data by applying the third voltage data to the function.

The source driver may further comprise a memory configured to store data, and the calibrating circuit may read out the first temperature data, the first voltage data, the second temperature data, and the second voltage data from the memory.

The source driver may further comprise a temperature sensor configured to generate first to through third analog signals corresponding to the first to through third voltage data depending on temperature.

The source driver may further comprise an analog-digital converter configured to digitize the first through third analog signals to the first through third voltage data.

In the source driver, the function may be a linear function obtained by combining the first temperature data, the first voltage data, the second temperature data, and the second voltage data.

In the source driver, the calibrating circuit may generate the function by adjusting a slope of the function and an offset of the function.

As described above, the present disclosure allows reducing errors in temperature sensing due to power consumption of a source driver. In addition, the present disclosure allows reducing errors in temperature of a panel measured by a source driver.

DETAILED DESCRIPTION

Figure 1:
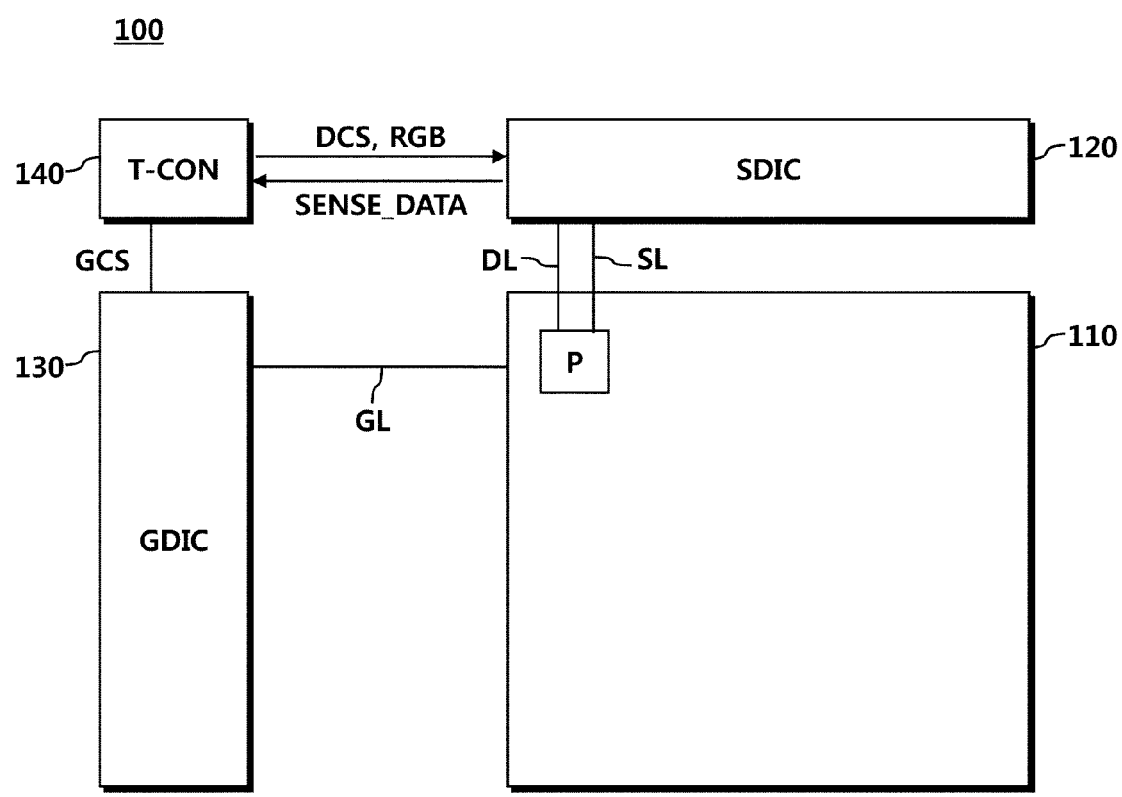
FIG. 1 illustrates the configuration of a display device according to an embodiment.

FIG. 1 illustrates the configuration of a display device according to an embodiment.

Referring to FIG. 1, the display device 100 may include a panel 110, a source driver 120, a gate driver 130, a timing controller 140, and the like.

A plurality of data lines DL, a plurality of gate lines GL, and a plurality of sensing lines SL may be arranged on the panel 110, and a plurality of pixels P may be arranged thereon.

The gate driver 130 may supply a scan signal of a turn-on voltage or a turn-off voltage to the gate lines GL. When a scan signal of a turn-on voltage is supplied to the pixel P, the corresponding pixel P is connected to the data line DL, and when a scan signal of a turn-off voltage is supplied to the pixel P, the corresponding pixel P is disconnected from the data line DL.

The source driver 120 supplies a data voltage to the data lines DL. The data voltage supplied to the data lines DL is transmitted to the pixel P connected to the data lines DL according to the scan signal.

The source driver 120 senses characteristic values (e.g., voltage and current) in each pixel P. The source driver 120 may be connected to each pixel P according to a scan signal, or may be connected to each pixel P according to a separate sensing signal. At this time, the sensing signal may be generated by the gate driver 130.

The timing controller 140 may supply various control signals to the gate driver 130 and the source driver 120. The timing controller 140 may generate a gate control signal GCS for initiating scanning depending on the timing implemented in each frame, and may transmit the same to the gate driver 130. In addition, the timing controller 140 may output image data RGB, which is converted from the image data input from the outside so as to conform to the data signal format used by the source driver 120, to the source driver 120. In addition, the timing controller 140 may transmit a data control signal DCS for controlling the source driver 120 to supply a data voltage to each pixel P according to each timing.

The timing controller 140 may compensate for the image data RGB depending on the characteristics of the pixel P, thereby transmitting the same. At this time, the timing controller 140 may receive pixel sensing data SENSE_DATA from the source driver 120. The pixel sensing data SENSE_DATA may include measurement values for the characteristics of the pixel P. The pixel sensing data SENSE_DATA may include a measurement value for a data voltage that the source driver 120 outputs to the data line DL. The pixel sensing data SENSE_DATA may include data on the temperature of the panel. The timing controller 140 may recognize the temperature of the panel from the temperature data, and may control a power management IC (PMIC) to supply an appropriate voltage to the panel depending on the temperature of the panel.

The panel 110 may be an organic light-emitting display panel. In this case, the pixels P arranged on the panel 110 may include organic light-emitting diodes (OLEDs) and one or more transistors. The characteristics of the organic light-emitting diode (OLED) and the transistor included in each pixel P may vary depending on the time or the surrounding environment, and the source driver 120 may sense the characteristics of the components included in each pixel P, thereby transmitting the same to the timing controller 140.

Figure 2:
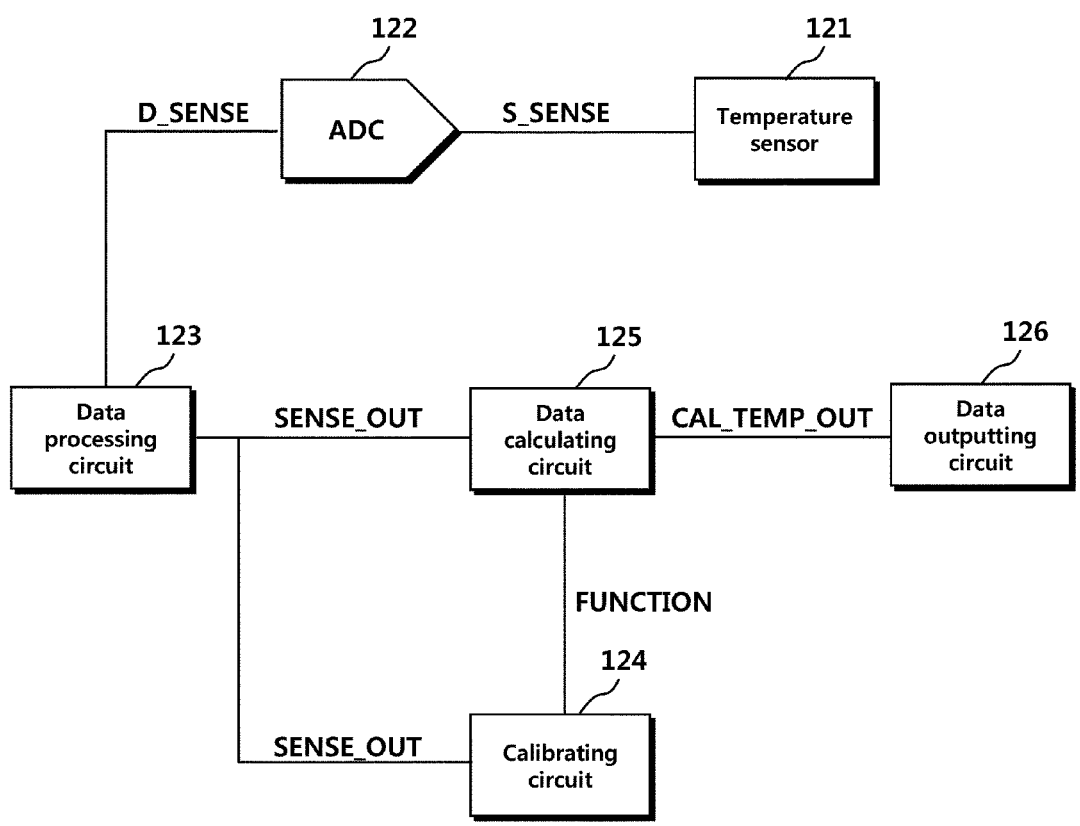
FIG. 2 is a diagram illustrating an example of the configuration of a source driver according to an embodiment.
Figure 3:
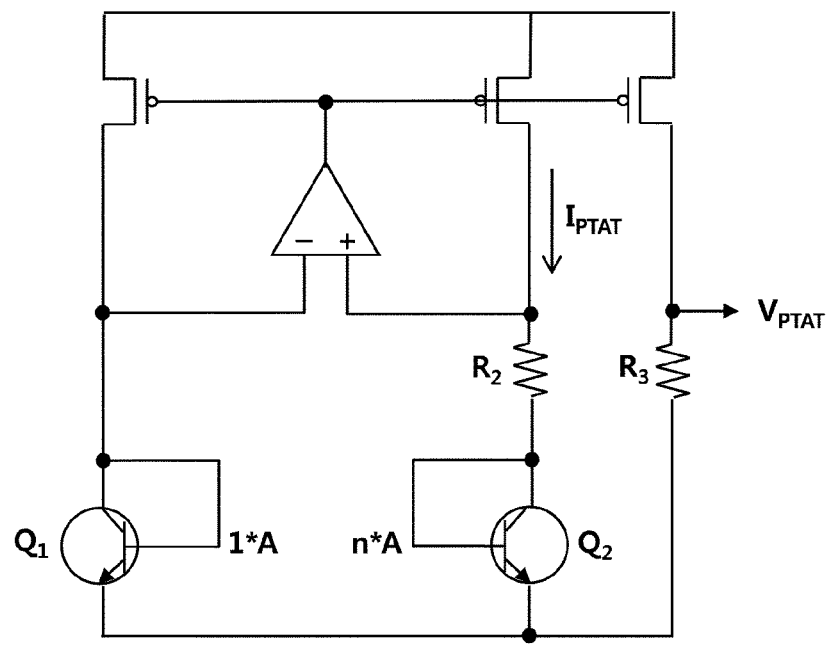
FIG. 3 is a circuit diagram illustrating an example of a temperature sensor according to an embodiment.

FIG. 2 is a diagram illustrating an example of the configuration of a source driver according to an embodiment, and FIG. 3 is a circuit diagram illustrating an example of a temperature sensor according to an embodiment.

Referring to FIG. 2, the source driver 120 may include a temperature sensor 121, an analog-to-digital convertor (ADC) 122, a data processing circuit 123, a calibrating circuit 124, a data calculating circuit 125, and a data outputting circuit 126.

The temperature sensor 121 may sense the temperature of the source driver 120. The temperature sensor 121 may be provided inside the source driver 120, and may detect the temperature of the source driver 120, thereby outputting the current or voltage corresponding to the detected temperature.

Referring to FIG. 3, the temperature sensor 121 may include a transistor, for example, a proportional-to-absolute-temperature (PTAT) circuit that includes a bipolar junction transistor (BJT). The circuit of the temperature sensor 121 may include a metal oxide semiconductor field-effect transistor (MOSFET), an amplifier, and a resistor, as well as the BJT. The temperature sensor 121 may cause $I_{PTAT}$ or $V_{PTAT}$ due to the difference in voltage between the BJT terminals, which varies depending on temperature. That is, the temperature sensor 121 may generate $I_{PTAT}$ or $V_{PTAT}$ corresponding to the ambient temperature. $I_{PTAT}$ or $V_{PTAT}$ may be proportional to temperature. Specifically, the temperature sensor 121 may exhibit a relationship between temperature and $I_{PTAT}$ or $V_{PTAT}$ as shown in Equation 1 below.

$$I_{PTAT} = \frac{V_{BB1} - V_{BB2}}{R_2} = \frac{1}{R_2}\frac{kT}{q}\ln(n) \quad \text{[Equation 1]}$$

$$V_{PTAT} = \frac{R_3}{R_2}\frac{kT}{q}\ln(n)$$

Here, "k" may indicate the Boltzmann constant, "q" may indicate the quantity of electric charge, "T" may indicate the temperature in degrees Kelvin, R2 and R3 may indicate resistance, $V_{BE1}$ may indicate the voltage between a base and an emitter of a first BJT Q1, and $V_{BE2}$ may indicate the voltage between a base and an emitter of a second BJT Q2. "n" of ln(n) is a coefficient indicating the scale of the contact area A between a base and an emitter, and is a constant. Therefore, according to Equation 1, since $V_{PTAT}$ and T are able to be expressed as a linear function, the temperature sensor 121 may output $V_{PTAT}$ proportional to T.

Referring back to FIG. 2, the temperature sensor 121 may output a sensing signal S_SENSE corresponding to the temperature. The sensing signal S_SENSE may include a voltage signal. The voltage signal may relate to the value of $V_{PTAT}$ in Equation 1. The temperature sensor 121 may transmit the sensing signal S_SENSE to the analog-to-digital converter 122.

The analog-to-digital convertor 122 may digitally convert the sensing signal S_SENSE, thereby generating digital sensing data D_SENSE. The sensing signal S_SENSE may include an analog voltage value, and the digital sensing data D_SENSE may include a digital voltage value. The digital sensing data D_SENSE may be filtered by the data processing circuit 123, and may then be used for generation of a function between temperature and voltage in the calibrating circuit 124.

The data processing circuit 123 may process the digital sensing data D_SENSE. The data processing circuit 123 may remove noise from the digital sensing data D_SENSE, and may output processed sensing data SENSE_OUT. The processed sensing data SENSE_OUT may include digitalized voltage data. The data processing circuit 123 may transmit the processed sensing data SENSE_OUT to the calibrating circuit 124 and the data calculating circuit 125.

The calibrating circuit 124 may produce a correlation between temperature and voltage, and may calibrate the correlation. The data calculating circuit 125 may calculate a new temperature, i.e., a calibrated temperature, from the calibrated correlation. The correlation may include a function having variables of temperature and voltage.

For example, the calibrating circuit 124 may generate a function between temperature and voltage from the processed sensing data SENSE_OUT. The processed sensing data SENSE_OUT may include voltage data, and may be stored in a memory device (not shown) together with temperature data so as to correspond thereto. The calibrating circuit 124 may produce a function between temperature and voltage from the temperature data stored in the memory device (not illustrated) and voltage data included in the processed sensing data SENSE_OUT, and may transmit the function to the data calculating circuit 125.

The data calculating circuit 125 may calculate calibrated temperature data CAL_TEMP_OUT from the function. The data calculating circuit 125 may receive function data FUNCTION from the calibrating circuit 124, and may receive processed sensing data SENSE_OUT from the data processing circuit 123. The data calculating circuit 125 may calculate calibrated temperature data CAL_TEMP_OUT by applying the processed sensing data SENSE_OUT to the function included in the function data FUNCTION. Since the temperature sensor 121 is operated while being included in the source driver 120, the calibrated temperature data CAL_TEMP_OUT may be the temperature of the source driver 120. Alternatively, if the heat of the panel 110 is transferred to the source driver 120, the calibrated temperature data CAL_TEMP_OUT may be the temperature of the panel 110.

The data outputting circuit 126 may output the calibrated temperature data CAL_TEMP_OUT. Before outputting the data, the data outputting circuit 126 may adjust a setting of bits of the calibrated temperature data CAL_TEMP_OUT. The data outputting circuit 126 may output the set temperature data. For example, the data outputting circuit 126 may reduce the number of bits of the calibrated temperature data CAL_TEMP_OUT. If the calibrated temperature data CAL_TEMP_OUT includes a decimal point, bits below the decimal point may be removed. Alternatively, digitally signed code may be configured for the calibrated temperature data CAL_TEMP_OUT.

Figure 4:
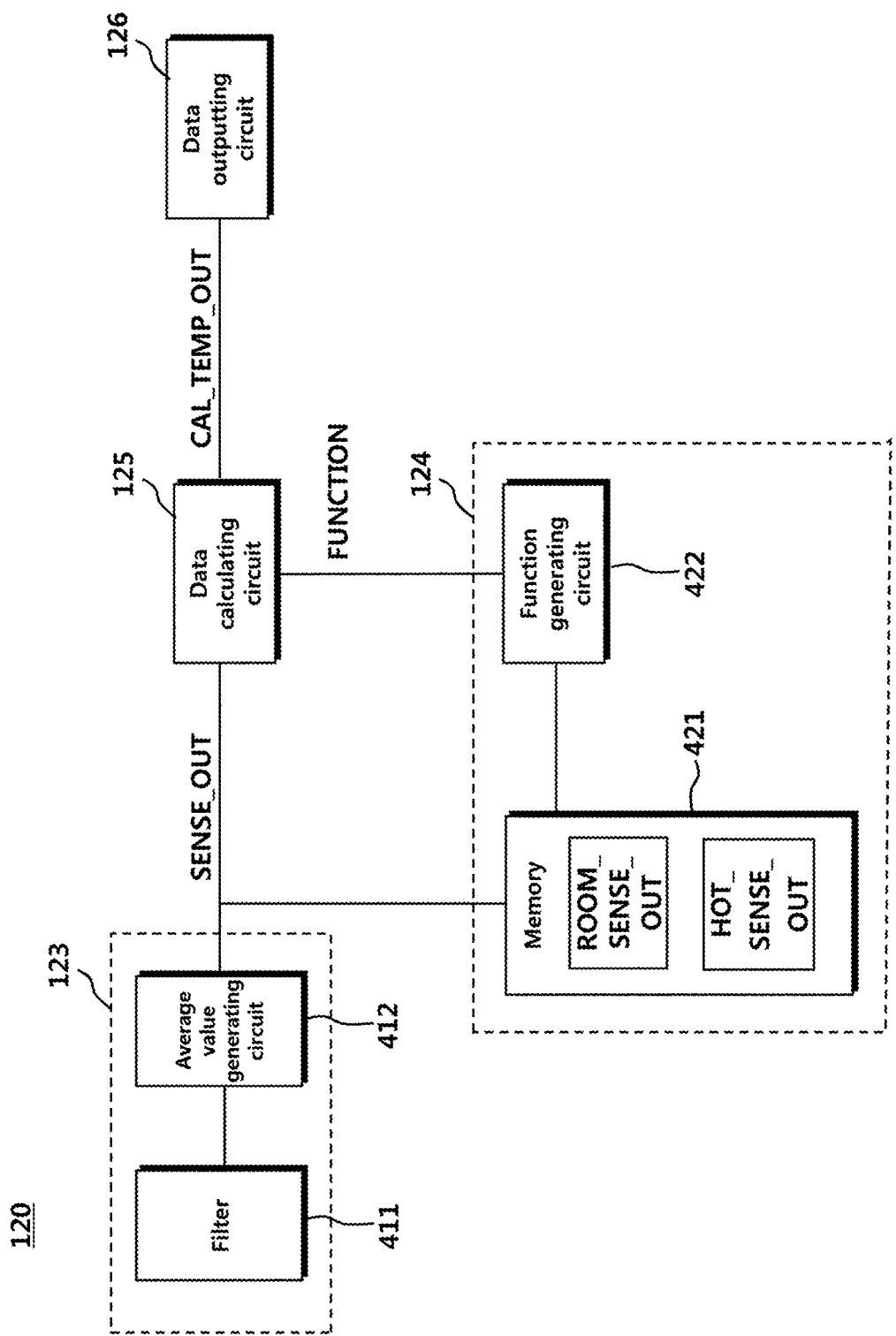
FIG. 4 is a diagram illustrating an example of the configuration of a data processing circuit and a calibrating circuit according to an embodiment.
Figure 5:
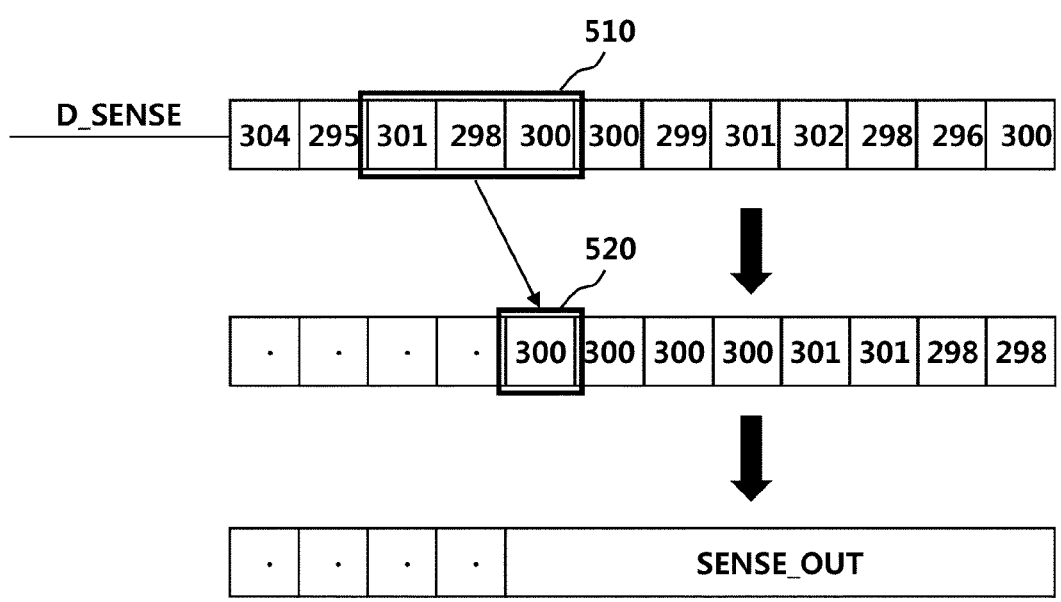
FIG. 5 is a diagram illustrating a process of processing data according to an embodiment.
Figure 6:
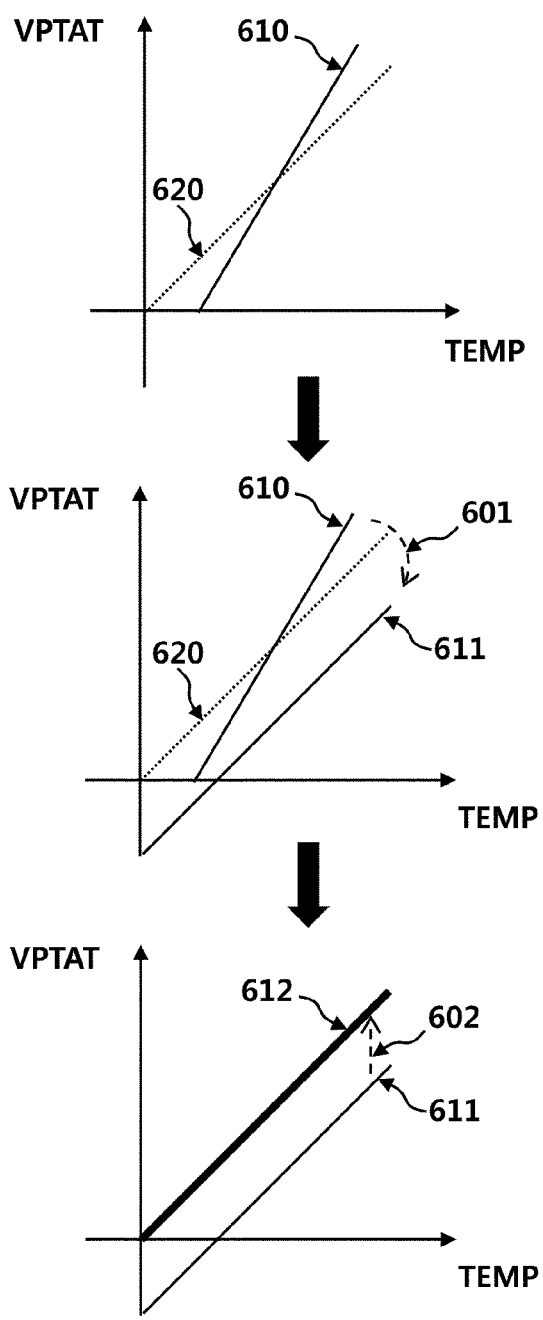
FIG. 6 is a diagram illustrating a process of generating a function according to an embodiment.

FIG. 4 is a diagram illustrating an example of the configuration of a data processing circuit and a calibrating circuit according to an embodiment, FIG. 5 is a diagram illustrating a process of processing data according to an embodiment, and FIG. 6 is a diagram illustrating a process of generating a function according to an embodiment.

Referring to FIG. 4, the data processing circuit 123 may include a filter 411 and an average value generating circuit 412. The data processing circuit 123 may remove noise from the digital sensing data D_SENSE using the filter 411 and the average value generating circuit 412.

Referring to FIG. 5, the process of removing noise by the filter 411 and the average value generating circuit 412 is illustrated.

First, the filter 411 may obtain a median value of the data (digital sensing data D_SENSE) sensed by the temperature sensor (121 in FIG. 2). The filter 411 may receive digital sensing data D_SENSE from the analog-to-digital converter (122 in FIG. 2). The filter 411 may sample the digital sensing data D_SENSE to a specific number, and may calculate a median value from the sampled data.

For example, the filter 411 may receive a series of digital sensing data D_SENSE in the order of 304, 295, 301, 298, 300, 300, . . . . Each piece of digital sensing data D_SENSE may be transmitted in a binary number of 9 bits. However, the present disclosure is not limited thereto, and the digital sensing data D_SENSE may be extended to more than 9 bits, or may be reduced below 9 bits, depending on the design thereof. The filter 411 may extract a plurality of pieces of digital sensing data D_SENSE through a sampling window 510. The sampling window 510 may also perform sampling in units of 9 bits depending on the digital sensing data D_SENSE, and the unit may be extended or reduced. The sampling window 510 may selectively extract basic data for calculating a median value from the series of digital sensing data D_SENSE. In this example, the sampling window 510 may sample three consecutive pieces of digital sensing data D_SENSE 301, 298, and 300. The filter 411 may calculate a median value 520 of the sampled digital sensing data D_SENSE 301, 298, and 300. In this example, the median value may be 300.

The filter 411 may initiate sampling at any point of the digital sensing data D_SENSE, and may perform sampling from the start point or the middle point of the received digital sensing data D_SENSE. For example, the filter 411 may initiate sampling from 304, which is the start point of the digital sensing data D_SENSE, thereby sampling 304, 295, and 301, or may initiate sampling from 301, which is the middle point thereof, thereby sampling 301, 298, and 300.

The filter 411 may generate a plurality of median values. In order to generate a plurality of median values, the filter 411 may shift the sampling window 510 by a constant unit, thereby performing sampling, and may continue to generate the median values from the sampled digital sensing data D_SENSE. For example, the filter 411 may sample 301, 298, and 300, and may then shift the sampling window 510 by one unit, thereby sampling 298, 300, and 300. The filter 411 may calculate a median value 300 from 298, 300, and 300.

The average value generating circuit 412 may calculate an average value from a plurality of median values generated from the digital sensing data D_SENSE using the filter 411. The average value generating circuit 412 may calculate an average value of all or some of the plurality of median values. The average value generating circuit 412 may generate an accurate average value using a decimal point. The average value generating circuit 412 may generate processed sensing data SENSE_OUT including the average value.

For example, the average value generating circuit 412 may receive median value data from the filter 411. The filter 411 may shift the sampling window 510 by one unit from 301, 298, and 300, thereby generating median value data including 300, 300, 300, 300, 301, 301, 298, and 298. The average value generating circuit 412 may calculate 299.750 as an average value of 300, 300, 300, 300, 301, 301, 298, and 298. The average value generating circuit 412 may generate processed sensing data SENSE_OUT of a total of 17 bits including 9 bits indicating "299" before the decimal point and 8 bits indicating "750" after the decimal point. The value after the decimal point in the processed sensing data SENSE_OUT is not limited to 8 bits, and may be extended to more than 8 bits or reduced below 8 bits depending on the design thereof.

Referring back to FIG. 4, the calibrating circuit 124 may include a memory 421 and a function generating circuit 422. The processed sensing data SENSE_OUT may be stored in the memory 421 together with the temperature data so as to correspond thereto. The function generating circuit 422 may generate a function between temperature and voltage from voltage data of the stored processed sensing data SENSE_OUT and the temperature data corresponding to the voltage data.

The calibrating circuit 124 may receive and store the processed sensing data SENSE_OUT including an average value in the memory 421. Specifically, the temperature sensor 121 may sense an ambient temperature, may output $V_{PTAT}$ according to the sensed temperature, and may generate voltage data on the basis of the output $V_{PTAT}$. The processed sensing data SENSE_OUT including the voltage data may be stored in the memory 421 while being matched to the temperature data corresponding to the voltage data. The matching between the processed sensing data SENSE_OUT and the temperature data and the result thereof may be pre-stored.

The digital sensing data D_SENSE, which is the sensing result of the temperature sensor (121 in FIG. 2), may be converted into processed sensing data SENSE_OUT through the analog-to-digital convertor (122 in FIG. 2) and the data processing circuit 123, and the processed sensing data SENSE_OUT may be stored in the memory 421 while being matched to the temperature data corresponding thereto. If the temperature sensor (121 in FIG. 2) performs a continuous sensing operation, the processed sensing data SENSE_OUT generated in every sensing operation may be stored in the memory 421 together with the temperature data.

For example, the temperature sensor (121 in FIG. 2) may cause $V_{PTAT}$ at room temperature through the temperature sensor circuit, and may generate a sensing signal including a voltage value indicating $V_{PTAT}$ at room temperature. The analog-to-digital converter (122 in FIG. 2) may digitize the sensing signal, and the data processing circuit 123 may process the digitized sensing signal, thereby producing processed room-temperature sensing data ROOM_SENSE_OUT. Here, the room temperature may be approximately 30° C. The processed room-temperature sensing data ROOM_SENSE_OUT may be stored in the memory 421 together with temperature data of 30° C. (room temperature).

Alternatively, the temperature sensor (121 in FIG. 2) may cause $V_{PTAT}$ at a high temperature through the temperature sensor circuit, and may generate a sensing signal including a voltage value indicating $V_{PTAT}$ at a high temperature. The analog-to-digital convertor (122 in FIG. 2) may digitize the sensing signal, and the data processing circuit 123 may process the digitized sensing signal, thereby producing processed high-temperature sensing data HOT_SENSE_OUT. Here, the high temperature may be approximately 90° C. The processed high-temperature sensing data HOT_SENSE_OUT may be stored in the memory 421 together with temperature data of 90° C.

The function generating circuit 422 may read out a plurality of pieces of processed sensing data SENSE_OUT and a plurality of pieces of temperature data corresponding thereto from the memory 421, and may generate the function from the plurality of pieces of processed sensing data SENSE_OUT and the plurality of pieces of temperature data, which are read out.

FIG. 6 illustrates a process of generating a function by the function generating circuit 422.

The function generating circuit 422 may generate a function indicating the relationship between temperature and voltage using the plurality of pieces of processed sensing data SENSE_OUT and the plurality of pieces of temperature data corresponding thereto. The processed sensing data SENSE_OUT may include voltage data on $V_{PTAT}$ output from the temperature sensor (121 in FIG. 2). If there are two or more pieces of temperature data and voltage data corresponding thereto, the function generating circuit 422 may produce a straight line by connecting two or more coordinates on the coordinate plane with an x-axis (TEMP) representing temperature and a y-axis ($V_{PTAT}$) representing voltage. The function generating circuit 422 may generate a linear function in a straight line on the x-y plane, and the linear function may indicate a correlation between temperature and voltage. Generating a function through two or more pieces of voltage data and two or more pieces of temperature data as described above may be referred to as "two-point calibration".

For example, processed room-temperature sensing data ROOM_SENSE_OUT and room-temperature data corresponding thereto may be stored in the memory 421, and processed high-temperature sensing data HOT_SENSE_OUT and high-temperature data corresponding thereto may be stored in the memory 421. The function generating circuit 422 may generate a linear function in a straight line connecting one point corresponding to room-temperature data and processed room-temperature sensing data ROOM_SENSE_OUT and the opposite point corresponding to high-temperature data and processed high-temperature sensing data HOT_SENSE_OUT. For example, the function generating circuit 422 may generate a second calibrated function 612 from 30° C., $V_{PTAT}$ at 30° C., 90° C., and $V_{PTAT}$ at 90° C. The second calibrated function 612 may match an ideal function 620 (denoted by the dotted line). Here, the ideal function 620 (denoted by the dotted line) may indicate a form required for the function generated by the calibrating circuit 124. In addition, the ideal function 620 (denoted by the dotted line) may indicate a correlation between temperature and voltage for which the calibrating circuit 124 arms.

Prior to calibration, the source driver (120 in FIG. 1) may have a correlation between temperature and voltage such as the basic function 610. Here, the basic function 610 may be a correlation between temperature and voltage, which is originally provided when manufacturing the source driver (120 in FIG. 1), and may be caused by manufacturing defects. The correlation such as the basic function 610 may not be sought by the calibrating circuit 124. Alternatively, the basic function 610 may indicate a correlation between temperature and voltage including errors. The source driver (120 in FIG. 1) may have a correlation such as the ideal function 620 (denoted by the dotted line), instead of a correlation such as the basic function 610, through two-point calibration for the correlation by the calibrating circuit 124. While the calibrating circuit 124 performs calibration, the function (correlation) may be understood to be calibrated as follows.

For example, the function generating circuit 422 of the calibrating circuit 124 may calibrate the slope of the basic function 610 so as to match the slope of the ideal function 620 (denoted by the dotted line), thereby generating a first calibrated function 611. Calibration of the slope may be a first calibration 601, and the slope of the first calibrated function 611 and the slope of the ideal function 620 (denoted by the dotted line) may be made the same through the first calibration 601.

Next, the function generating circuit 422 of the calibrating circuit 124 may compensate for the y-intercept of the first calibrated function 611 so as to match the y-intercept of the ideal function 620 (denoted by the dotted line), thereby generating a second calibrated function 612. Compensation for the y-intercept may be second calibration 602, which may be referred to as "offset calibration". The y-intercept of the second calibrated function 612 and the y-intercept of the ideal function 620 (denoted by the dotted line) may be made the same through the second calibration 602.

Eventually, the function generating circuit 422 may generate the second calibrated function 612 that matches the ideal function 620 (denoted by the dotted line), which is the desired correlation between temperature and voltage $V_{PTAT}$, through two calibrations for the slope and the y-intercept of the basic function 610.

Referring back to FIG. 4, the data calculating circuit 125 may apply new voltage data to the function data FUNCTION, thereby generating new temperature data based on the function data FUNCTION.

The data calculating circuit 125 may receive function data FUNCTION from the calibrating circuit 124. Here, the function data FUNCTION may be a result obtained by performing calibration on the function generated by the function generating circuit 422 from a plurality of pieces of processed sensing data SENSE_OUT and temperature data stored in the memory 421. For example, the function generating circuit 422 may generate the second calibrated function 612 from processed room-temperature sensing data ROOM_SENSE_OUT, room-temperature data at 30° C., processed high-temperature sensing data HOT_SENSE_OUT, and high-temperature data at 90° C. The function data FUNCTION may include the second calibrated function 612, and the data calculating circuit 125 may receive the second calibrated function 612 from the function generating circuit 422.

The data calculating circuit 125 may generate new temperature data by applying new voltage data included in the processed sensing data SENSE_OUT to the function data FUNCTION. The data processing circuit 123 may transmit the processed sensing data SENSE_OUT both to the calibrating circuit 124 and to the data calculating circuit 125. The data calculating circuit 125 may generate new temperature data according to the function data FUNCTION by applying voltage data included in the processed sensing data SENSE_OUT to the function data FUNCTION. The new temperature data may be referred to as "calibrated temperature data" CAL_TEMP_OUT.

Here, the processed sensing data SENSE_OUT including new voltage data may indicate voltage data, other than the processed sensing data SENSE_OUT stored in the memory 421 for use in generation of a function, received by the data calculating circuit 125. The data calculating circuit 125 may calculate the new temperature data by applying the new voltage data to a function generated in advance. Here, the new voltage data may be referred to as "input voltage data", and the new temperature data may be referred to as "output temperature data".

Specifically, the data calculating circuit 125 may apply voltage data included in the processed sensing data SENSE_OUT to the second calibrated function 612 included in the function data FUNCTION, thereby calculating calibrated temperature data CAL_TEMP_OUT. Here, the processed sensing data SENSE_OUT applied to the second calibrated function 612 may be the same as or different from that used in generation of the second calibrated function 612. That is, if the second calibrated function 612 is generated from processed room-temperature sensing data ROOM_SENSE_OUT and processed high-temperature sensing data HOT_SENSE_OUT, the processed sensing data SENSE_OUT applied to the second calibrated function 612 may be one of either the processed room-temperature sensing data ROOM_SENSE_OUT or the processed high-temperature sensing data HOT_SENSE_OUT, or may be processed sensing data SENSE_OUT, other than the processed room-temperature sensing data ROOM_SENSE_OUT and the processed high-temperature sensing data HOT_SENSE_OUT.

For example, if the data calculating circuit 125 applies $V_{PTAT}$ corresponding to a room temperature of 30° C. to the second calibrated function 612, calibrated temperature data CAL_TEMP_OUT corresponding thereto may be generated. The calibrated temperature data CAL_TEMP_OUT may indicate a temperature of 30° C. Alternatively, if the data calculating circuit 125 applies $V_{PTAT}$ corresponding to a high temperature of 90° C. to the second calibrated function 612, calibrated temperature data CAL_TEMP_OUT corresponding thereto may be generated. The calibrated temperature data CAL_TEMP_OUT may indicate a temperature of 90° C.

The data calculating circuit 125 applies the processed sensing data SENSE_OUT to the basic function 610 before calibration, but applies the processed sensing data SENSE_OUT to the second calibrated function 612 after calibration. Accordingly, the temperature data output before calibration and the calibrated temperature data CAL_TEMP_OUT after calibration may be different from each other. Here, it may be understood that the temperature data output before calibration contains an error reflected therein, but that the calibrated temperature data CAL_TEMP_OUT after calculation has no error, which has been removed therefrom.

The source driver 120 according to the present disclosure may find an ideal linear function between temperature and voltage, and may make an existing correlation (function) match the same, thereby correcting the temperature value. In addition, the source driver 120 according to the present disclosure may use two arbitrary points relating temperature and voltage, which are digitally expressed, instead of satisfying specific conditions such as sequence, and may store data necessary for calibration in a storage device and use the same. Accordingly, the present disclosure may provide the effect of reducing errors with high accuracy by a simple method.

The data outputting circuit 126 may output calibrated temperature data CAL_TEMP_OUT and a new temperature value according thereto. Before outputting the data, the data outputting circuit 126 may process the calibrated temperature data CAL_TEMP_OUT, and may then output the same. For example, the data outputting circuit 126 may reduce the number of bits of the calibrated temperature data CAL_TEMP_OUT. In the case where the processed sensing data SENSE_OUT is configured as 16 bits, the data outputting circuit 126 may reduce the calibrated temperature data CAL_TEMP_OUT to 8 bits while removing the digits after the decimal point, and may then output the same.

Figure 7:
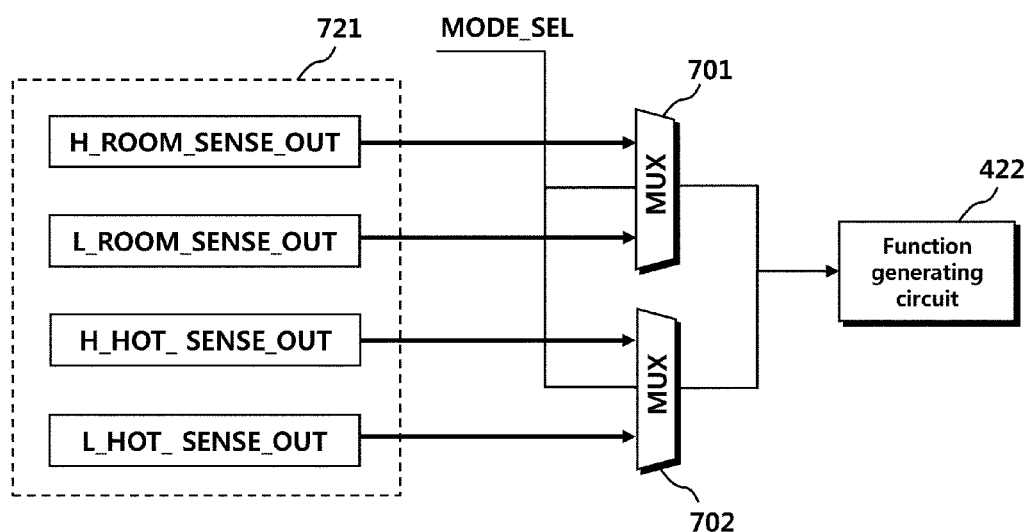
FIG. 7 is a diagram illustrating a process of differently selecting data depending on a display mode in a calibrating circuit according to another embodiment.

FIG. 7 is a diagram illustrating a process of differently selecting data depending on a display mode in a calibrating circuit according to another embodiment.

Referring to FIG. 7, the calibrating circuit 724 may selectively use the stored processed sensing data SENSE_OUT depending on a display mode, thereby performing different calibration processes.

Even if the source driver (120 in FIG. 1) outputs calibrated temperature data according to a correlation between temperature and voltage (e.g., a function), the calibrated temperature data may contain an error due to several factors. For example, the ground voltage of the temperature sensor (121 in FIG. 2) may increase, and if the ground voltage increases, $V_{PTAT}$ generated by the temperature sensor (121 in FIG. 2) may vary, and the temperature data output based on $V_{PTAT}$ may not properly reflect the actual temperature of the source driver (120 in FIG. 1). A change in the power consumption of the source driver (120 in FIG. 1) or parasitic resistance due to conducting wires may cause a change in the ground voltage.

As another example, if the source driver (120 in FIG. 1) consumes a large amount of power, the internal temperature of the source driver (120 in FIG. 1) may increase. If the internal temperature increases, $V_{PTAT}$ generated by the temperature sensor (121 in FIG. 2) may vary, and the temperature data output based on $V_{PTAT}$ may not properly reflect the actual temperature of the source driver (120 in FIG. 1) (e.g., the external temperature of the source driver 120 in FIG. 1).

The power consumption of the source driver (120 in FIG. 1), which generates an error in the temperature data as described above, may define a display mode depending on whether the amount of power consumption is large or small. The display mode may include a high-power mode and a low-power mode. The high-power mode may indicate the case in which the source driver (120 in FIG. 1) operates while consuming a large amount of power. The low-power mode may indicate the case in which the source driver (120 in FIG. 1) operates while consuming a small amount of power.

Meanwhile, the display mode may vary depending on the driving mode of the source driver (120 in FIG. 1).

For example, if a panel outputs an image at a high refresh rate (RR), since the source driver (120 in FIG. 1) consistently supplies a constant data voltage to the panel, the amount of power consumed by the source driver (120 in FIG. 1) and the amount of heat emitted according thereto may increase, which may also raise the temperature of the source driver (120 in FIG. 1). The display device (100 in FIG. 1) including the source driver (120 in FIG. 1) is in a high-power mode (driving mode). At this time, only the temperature of the source driver (120 in FIG. 1) inside the display device (100 in FIG. 1) may be locally high.

On the other hand, if the panel outputs an image at a low refresh rate, since the source driver (120 in FIG. 1) supplies a data voltage relatively less continuously than the high refresh rate, the amount of power consumed by the source driver (120 in FIG. 1) and the amount of heat emitted according thereto may be reduced, and the temperature of the source driver (120 in FIG. 1) may also be lowered. The display device (100 in FIG. 1) including the source driver (120 in FIG. 1) may be in a low-power mode (standby mode). At this time, only the temperature of the source driver (120 in FIG. 1) inside the display device (100 in FIG. 1) may be locally low.

The temperature of the source driver (120 in FIG. 1), that is, the display mode, may affect an error in the temperature sensor (121 in FIG. 2). Therefore, the error in the temperature sensor (121 in FIG. 2) may vary depending on the display mode of the source driver (120 in FIG. 1). For example, the temperature sensor (121 in FIG. 2) may sense the temperature of the source driver (120 in FIG. 1) differently from the actual temperature in the high-power mode and the low-power mode. Therefore, the calibrating circuit 724 of the source driver (120 in FIG. 1) needs to perform calibration differently between the high-power mode and the low-power mode. The calibrating circuit 724 may selectively read out data for calibration in each display mode depending on the display mode, thereby using the same for calibration.

For differential calibration depending on the display mode, the calibrating circuit 724 may read out different data from the memory 721 depending on the display mode, and may generate a function using the read data. Here, the processed sensing data SENSE_OUT (voltage data) may be stored in the memory 721 together with the temperature data corresponding thereto while being matched therewith, and may be read out from the memory 721.

For example, processed sensing data SENSE_OUT may be stored in the memory 721 for each display mode. The display mode may include a high-power mode and a low-power mode. The high-power mode may indicate the case in which the amount of power consumed by the source driver (120 in FIG. 1) and the amount of heat emitted therefrom are large, and the low-power mode may indicate the case in which the amount of power consumed by the source driver (120 in FIG. 1) and the amount of heat emitted therefrom are small. Therefore, processed sensing data SENSE_OUT, such as processed high-power room-temperature sensing data H_ROOM_SENSE_OUT and processed high-power high-temperature sensing data H_HOT_SENSE_OUT used in the high-power mode and such as processed low-power room-temperature sensing data L_ROOM_SENSE_OUT and processed low-power high-temperature sensing data L_HOT_SENSE_OUT used in the low-power mode, may be stored in the memory 721.

The calibrating circuit 724 may select different processed sensing data SENSE_OUT depending on the display mode through MUXs 701 and 702.

The MUXs 701 and 702 may include a first MUX 701 receiving inputs of processed high-power room-temperature sensing data H_ROOM_SENSE_OUT and processed low-power room-temperature sensing data L_ROOM_SENSE_OUT and a second MUX 702 receiving inputs of processed high-power high-temperature sensing data H_HOT_SENSE_OUT and processed low-power high-temperature sensing data L_HOT_SENSE_OUT.

The MUXs 701 and 702 may receive a mode selection signal MODE_SEL. The mode selection signal MODE_SEL may control the MUXs 701 and 702 to select different processed sensing data SENSE_OUT from the memory 721 depending on the display mode of the source driver (120 in FIG. 1). A mode selector (not shown) or the function generating circuit 422 included in the calibrating circuit 724 may transmit a mode selection signal MODE_SEL to the MUXs 701 and 702.

For example, if the MUXs 701 and 702 receive a mode selection signal MODE_SEL for selecting a first mode, the first MUX 701 may read out processed high-power room-temperature sensing data H_ROOM_SENSE_OUT, and the second MUX 702 may read out processed high-power high-temperature sensing data H_HOT_SENSE_OUT, respectively, from the memory 721. Alternatively, if the MUXs 701 and 702 receive a mode selection signal MODE_SEL for selecting a second mode, the first MUX 701 may read out processed low-power room-temperature sensing data L_ROOM_SENSE_OUT, and the second MUX 702 may read out processed low-power high-temperature sensing data L_HOT_SENSE_OUT, respectively, from the memory 721.

The function generating circuit 422 may receive processed sensing data SENSE_OUT from the MUXs 701 and 702, and may output calibrated temperature data CAL_TEMP_OUT through generation of a function.

For example, if the MUXs 701 and 702 receive a mode selection signal MODE_SEL for selecting a first mode, the function generating circuit 422 may generate a function from processed high-power room-temperature sensing data H_ROOM_SENSE_OUT and processed high-power high-temperature sensing data H_HOT_SENSE_OUT, and may perform compensation for the slope and the y-intercept of the function, thereby generating a compensatory function. The data calculating circuit 125 may calculate calibrated temperature data CAL_TEMP_OUT by applying processed sensing data SENSE_OUT to the compensatory function. Alternatively, if the MUXs 701 and 702 receive a mode selection signal MODE_SEL for selecting a second mode, the function generating circuit 422 may generate a function from processed low-power room-temperature sensing data L_ROOM_SENSE_OUT and processed low-power high-temperature sensing data L_HOT_SENSE_OUT. The function may be generated by calibrating the slope and the y-intercept of the function. The data calculating circuit 125 may calculate calibrated temperature data CAL_TEMP_OUT by applying processed sensing data SENSE_OUT to the function.

Although it has been described that the first mode indicates a high-power mode and the second mode indicates a low-power mode in the above embodiment, the first mode may indicate a low-power mode and the second mode may indicate a high-power mode depending on connection methods or the characteristics of a mode selection signal MODE_SEL.

As described above, data may be differentially used depending on the amount of power consumption (or a display mode) of the source driver (120 in FIG. 1) according to driving of the panel, thereby removing any discrepancy between the sensed temperature and the actual temperature caused by the power consumption (the amount of heat) of the source driver (120 in FIG. 1).

Figure 8:
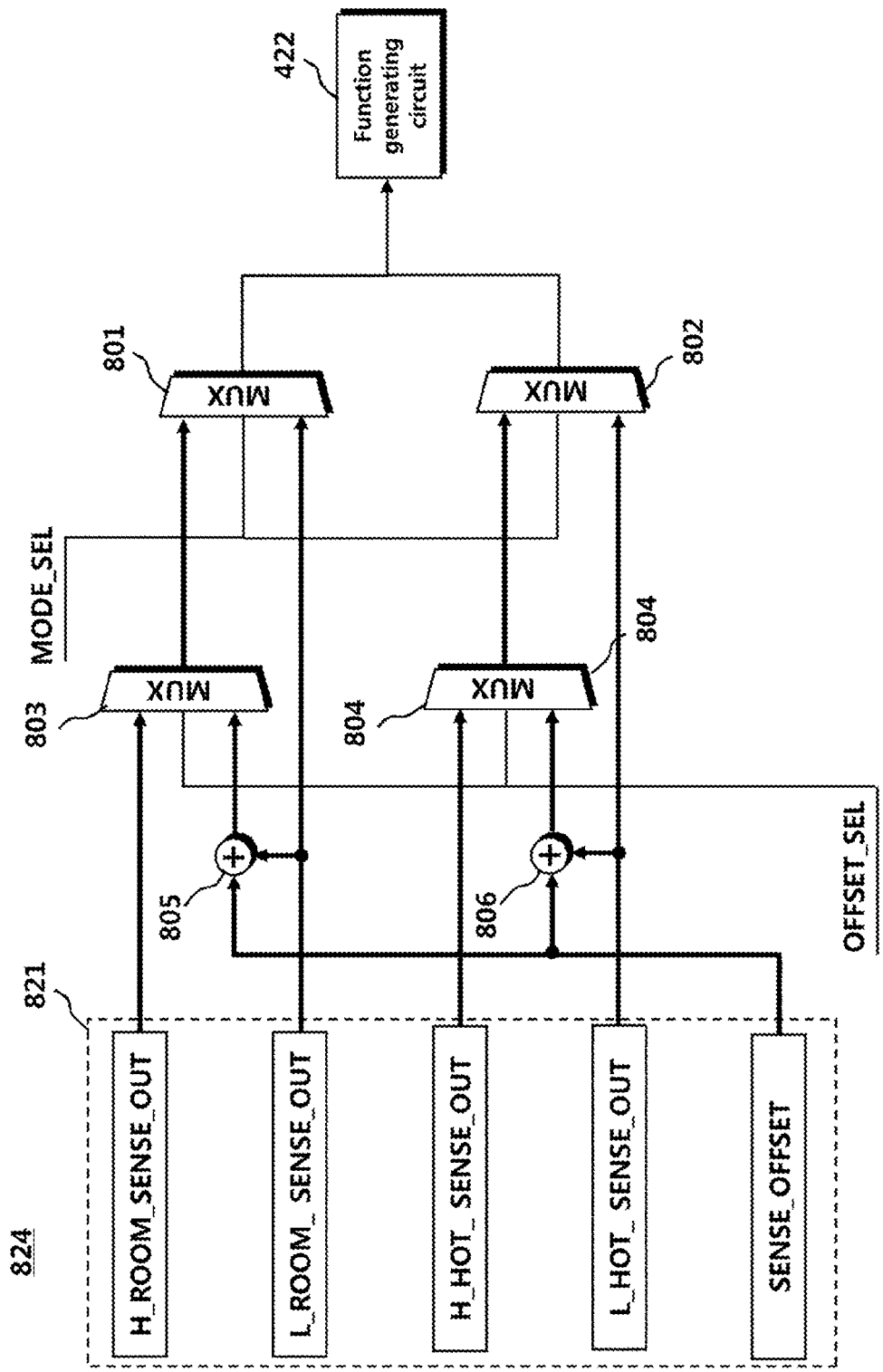
FIG. 8 is a diagram illustrating a process of selecting offset reflection data according to a display mode in a calibrating circuit according to another embodiment.

FIG. 8 is a diagram illustrating a process of selecting offset reflection data according to a display mode in a calibrating circuit according to another embodiment.

Referring to FIG. 8, the calibrating circuit 824 may use processed sensing data SENSE_OUT reflecting an offset in a calibration process. The reflection of an offset may include adding or subtracting a specific value to or from the data. In addition, the offset may be primarily reflected in voltage data of the processed sensing data SENSE_OUT. Hereinafter, the processed sensing data SENSE_OUT (voltage data) may be stored in a memory 821 together with corresponding temperature data so as to be matched therewith, or may be read out from the memory 821.

The processed sensing data SENSE_OUT may be stored in the memory 821 for each display mode, and offset data SENSE_OFFSET may also be stored therein.

The calibrating circuit 824 may add offset data SENSE_OFFSET to the processed sensing data SENSE_OUT stored in the memory 821 through adders 805 and 806. Alternatively, the calibrating circuit 824 may subtract offset data SENSE_OFFSET from the processed sensing data SENSE_OUT stored in the memory 821 through a subtractor (not shown).

The calibrating circuit 824 may reflect offset data SENSE_OFFSET to the processed sensing data SENSE_OUT corresponding to any one display mode.

For example, the adders 805 and 806 may reflect the offset data SENSE_OFFSET only to the processed sensing data SENSE_OUT in a low-power mode. The adders 805 and 806 may add an offset value of the offset data SENSE_OFFSET to the processed low-power room-temperature sensing data L_ROOM_SENSE_OUT, and may add an offset value to the processed low-power high-temperature sensing data L_HOT_SENSE_OUT. Alternatively, the adders 805 and 806 may also reflect the offset data SENSE_OFFSET to processed sensing data SENSE_OUT in a high-power mode. The adders 805 and 806 may add an offset value of the offset data SENSE_OFFSET to the processed high-power room-temperature sensing data H_ROOM_SENSE_OUT, and may add the offset value to the processed high-power high-temperature sensing data H_HOT_SENSE_OUT.

The calibrating circuit 824 may select the processed sensing data SENSE_OUT reflecting the offset depending on the display mode through MUXs 803 and 804.

The MUXs 803 and 804 may include a third MUX 803 receiving inputs of the processed high-power room-temperature sensing data H_ROOM_SENSE_OUT and the processed low-power room-temperature sensing data L_ROOM_SENSE_OUT, to which the offset data SENSE_OFFSET is added, and a fourth MUX 804 receiving inputs of the processed high-power high-temperature sensing data H_HOT_SENSE_OUT and the processed low-power high-temperature sensing data L_HOT_SENSE_OUT, to which the offset data SENSE_OFFSET is added.

The MUXs 803 and 804 may receive an offset selection signal OFFSET_SEL. The offset selection signal OFFSET_SEL may control the MUXs 803 and 804 to select the processed sensing data SENSE_OUT reflecting the offset data SENSE_OFFSET from the memory 821 depending on the display mode of the display device (100 in FIG. 1). An offset selector (not shown) or a function generating circuit 422 included in the calibrating circuit 824 may transmit an offset selection signal OFFSET_SEL to the MUXs 803 and 804.

For example, if the MUXs 803 and 804 receive an offset selection signal OFFSET_SEL for selecting offset-reflected data, the third MUX 803 may read out the processed low-power room-temperature sensing data L_ROOM_SENSE_OUT, to which the offset data SENSE_OFFSET is added, and the fourth MUX 804 may read out the processed low-power high-temperature sensing data L_HOT_SENSE_OUT, to which the offset data SENSE_OFFSET is added, respectively, from the memory 821. Alternatively, if the MUXs 803 and 804 receive an offset selection signal OFFSET_SEL for not selecting the offset-reflected data, the third MUX 803 may read out processed high-power room-temperature sensing data H_ROOM_SENSE_OUT, and the fourth MUX 804 may read out processed high-power high-temperature sensing data H_HOT_SENSE_OUT, respectively, from the memory 821.

The MUXs 801 and 802 may perform the same function as the MUXs 701 and 702 shown in FIG. 7, but may differ therefrom in that one of the input terminals is connected to the output terminals of the MUXs 803 and 804. Accordingly, if the MUXs 801 and 802 receive a mode selection signal MODE_SEL for selecting a first mode, the first MUX 801 may output the data output from the third MUX 803 (the processed high-power room-temperature sensing data H_ROOM_SENSE_OUT or the processed low-power room-temperature sensing data L_ROOM_SENSE_OUT, to which the offset data SENSE_OFFSET is added), and the second MUX 802 may output the data output from the fourth MUX 804 (the processed high-power high-temperature sensing data H_HOT_SENSE_OUT or the processed low-power high-temperature sensing data L_HOT_SENSE_OUT, to which the offset data SENSE_OFFSET is added).

The function generating circuit 422 may generate a function using the processed sensing data SENSE_OUT eventually output from the MUXs 801 and 802.

As described above, the calibrating circuit 824 may select different data depending on a high-power mode and a low-power mode according to driving of the panel, and may further select data reflecting offset data SENSE_OFFSET for any one mode, thereby generating calibrated temperature data CAL_TEMP_OUT. Although FIG. 8 illustrates that offset data SENSE_OFFSET is reflected in the processed low-power room-temperature sensing data L_ROOM_SENSE_OUT and processed low-power high-temperature sensing data L_HOT_SENSE_OUT, which are used in a low-power mode, the present disclosure is not limited thereto, and offset data SENSE_OFFSET may also be reflected in the processed high-power room-temperature sensing data H_ROOM_SENSE_OUT and processed high-power high-temperature sensing data H_HOT_SENSE_OUT, which are used in a high-power mode.

Figure 9:
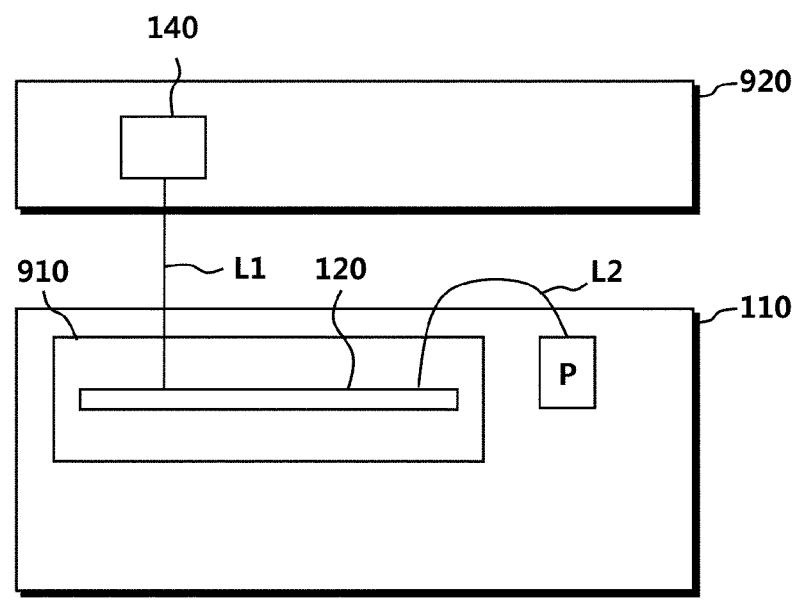
FIG. 9 is a diagram illustrating the configuration of a display device according to another embodiment.

FIG. 9 is a diagram illustrating the configuration of a display device according to another embodiment.

Referring to FIG. 9, the display device 900 may include a chip-on-film (COF) package 910.

The chip-on-film package 910 may have a semiconductor chip (e.g., the source driver 120) mounted thereon. The source driver 120 may receive image data from the timing controller 140 disposed in a circuit board 920 through a first line L1, and may output a data driving signal to the panel 110 through a second line L2.

The source driver 120 included in the chip-on-film package 910 may sense the temperature of the panel 110 through the temperature sensor 121. The structure in which the chip-on-film package 910 and the panel 110 are coupled to be adjacent to each other may enable the source driver 120 to sense the temperature of the panel 110.

The temperature of the panel 110 may be unrelated to voltage data and temperature data used in the process of calibrating the source driver 120. That is, the temperature of the panel 110 may not be the temperature data stored in the memory (421 in FIG. 4) in order to generate the second calibrated function (612 in FIG. 6). The source driver 120 may sense the temperature of the panel 110 through the temperature sensor 121, and may output new temperature data through the second calibrated function (612 in FIG. 6). The source driver 120 may indicate the output temperature data as the temperature of the panel 110.

For reference, the above calibration may be performed in the process of manufacturing or testing the source driver 120. In one embodiment, the calibration may be performed before the source driver 120 is coupled to the chip-on-film package 910.

If the chip-on-film package 910 is attached or coupled to anyone surface of the panel 110 so as to be in contact therewith, the heat of the panel 110 may be transferred thereto. Due to the heat transfer from the panel 110 to the chip-on-film package 910, the temperature of the chip-on-film package 910 may be almost the same as the temperature of the panel 110. Since the source driver 120 is included in the chip-on-film package 910, the temperature of the source driver 120 may also be almost the same as the temperature of the panel 110. The source driver 120 may output a calibrated temperature through the calibration process described above, and the calibrated temperature may be regarded as the temperature of the panel 110.

The chip-on-film package 910 may be coupled to the entire area of one surface of the panel 110. A large coupling area may facilitate heat transfer from the panel 110 to the chip-on-film package 910, so that the temperature of the chip-on-film package 910, i.e., the temperature of the source driver 120, may be close to the temperature of the panel 110. Alternatively, as shown in FIG. 9, if the chip-on-film package 910 is coupled to a portion of one surface of the panel 110 such that the entire area of the chip-on-film package 910 is in contact therewith, the temperature of the source driver 120 may be close to the temperature of the panel 110.

Figures 10, 11:
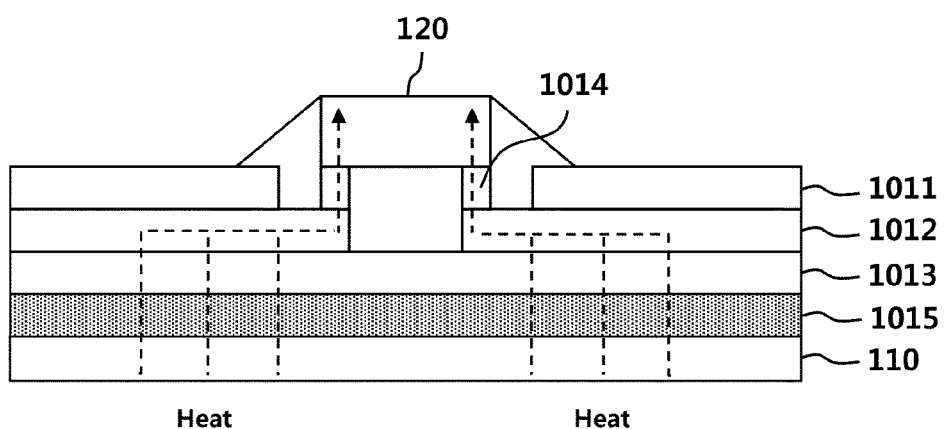
FIG. 10 is a cross-sectional view illustrating an example of coupling between a source driver and a panel according to another embodiment.
FIG. 11 is a diagram illustrating a first example showing an experimental result for calibration of temperature according to the embodiment of the present disclosure.

FIG. 10 is a cross-sectional view illustrating an example of coupling between a source driver and a panel according to another embodiment.

Referring to FIG. 10, the chip-on-film package 910 may include a source driver 120, an insulating layer 1011, a metal line layer 1012, a film layer 1013, a bumper 1014, and a heat sink plate 1015.

The insulating layer 1011 may be positioned on the metal line layer 1012, thereby improving the insulation of the metal line layer 1012 and protecting the metal lines from external influences. The insulating layer 1011 may include so-called surface resist (SR) materials.

The metal line layer 1012 may be formed of a plurality of metal lines to be disposed on the film layer 1013. The metal line layer 1012 may include a first line (see L1 in FIG. 9) and a second line (see L2 in FIG. 9).

The metal line layer 1012 may be formed of a metal material such as copper, and may be electrically connected to the source driver 120 through the bumper 1014.

The film layer 1013, which is a flexible film, may be a polyimide-based flexible film.

The bumper 1014 may be formed on the lower surface of the source driver 120, and may be coupled to the exposed portion of the metal line layer 1012 (i.e., the portion where the insulating layer 1011 is not formed), thereby electrically connecting the source driver 120 and the metal line layer 1012.

The heat sink plate 1015 may be interposed between the film layer 1013 and the panel 110, and may promote heat transfer between the source driver 120 and the panel 110. The heat sink plate 1015 may have high thermal conductivity because it includes a heat-dissipating metal made of a metal material such as aluminum. The heat of the panel 110 may be transmitted to the source driver 120 through the heat sink plate 1015, the film layer 1013, the metal line layer 1012, and the bumper 1014 (see the dotted arrow).

If the chip-on-film package 910 is attached to or is in contact with the panel 110 with the heat sink plate 1015 as a boundary therebetween, the heat of the panel 110 may be transferred to the source driver 120. The temperature of the source driver 120 may be the same as the temperature of the panel 110, and the source driver 120 may sense the temperature, and may output a calibrated temperature according to the embodiment of the present disclosure. The heat sink plate 1015 interposed between the source driver 120 and the panel 110 may help the source driver 120 to accurately recognize the temperature of the panel 110.

FIG. 11 is a diagram illustrating a first example showing an experimental result for the calibration of temperature according to the embodiment of the present disclosure.

FIG. 11 shows a table in which calibrated temperatures output through a calibration process according to the embodiment of the present disclosure are compared with actual temperatures.

In the case where a first sample (sample 1) and a second sample (sample 2) are placed in the chamber and the temperature of the chamber is sequentially set to −20° C., 0° C., 10° C., 20° C., 30° C., 40° C., 50° C., and 90° C., both the first sample and the second sample have calibrated temperatures almost the same as the actual temperatures of the chamber. The first and second samples may be the source drivers (120 in FIG. 1) for implementing the embodiment of the present disclosure, or may be the display device (100 in FIG. 1) including the same.

The first sample exhibits the same values at −20° C., 0° C., 10° C., and 20° C., except for an error of about 1° C. in some sections. The second sample also exhibits the same values at 0° C., 10° C., 20° C., and 30° C., except for an error of about 1° C. in some sections.

Figure 12:
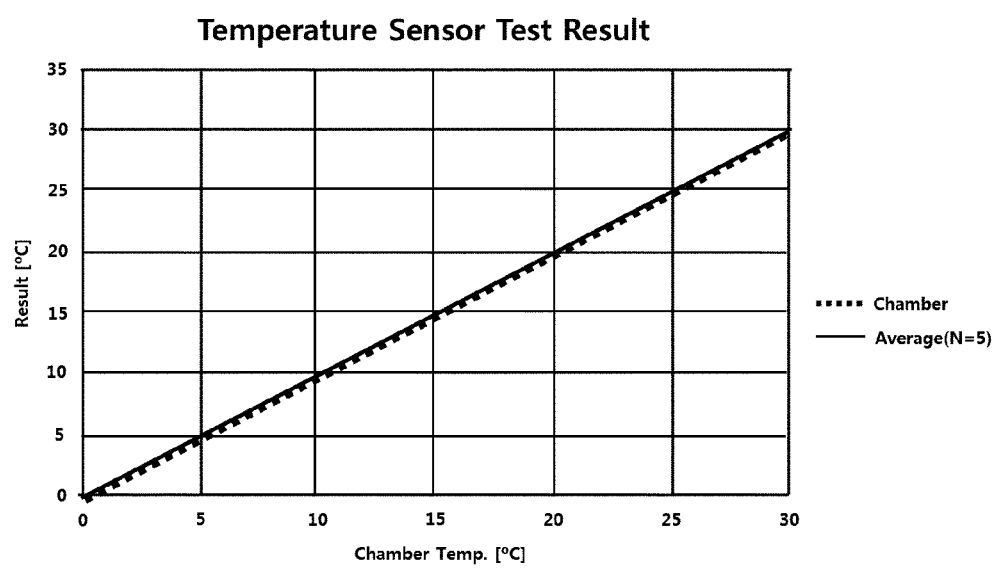
FIG. 12 is a diagram illustrating a second example showing an experimental result for calibration of temperature according to the embodiment of the present disclosure.

FIG. 12 is a diagram illustrating a second example showing an experimental result for calibration of temperature according to the embodiment of the present disclosure.

FIG. 12 shows a graph in which calibrated temperatures output through a calibration process according to the embodiment of the present disclosure are compared with actual temperatures.

The graph is obtained by comparing an average value of the calibrated temperatures output 5 times (N=5) from the sample placed in the chamber (indicated as "Result"), while the temperature of the chamber is continuously configured, with the actual temperatures of the chamber (indicated as "Chamber Temp."). The graph shows that the average calibrated temperature value of the sample matches the actual temperature value of the chamber.

Figure 13:
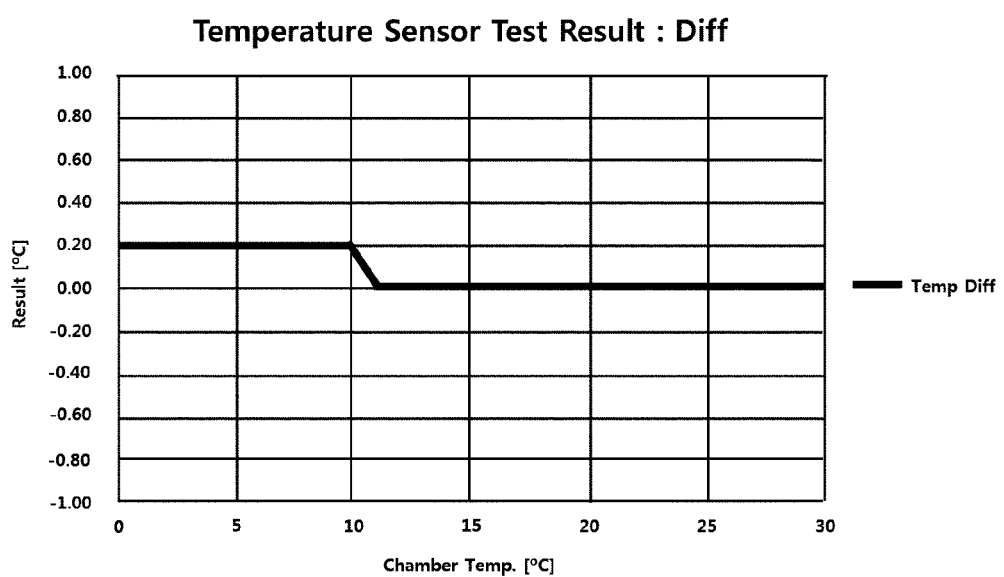
FIG. 13 is a diagram illustrating a third example showing an experimental result for calibration of temperature according to the embodiment of the present disclosure.

FIG. 13 is a diagram illustrating a third example showing an experimental result for calibration of temperature according to the embodiment of the present disclosure.

FIG. 13 illustrates a graph showing the difference between the calibrated temperature output through a calibration process according to the embodiment of the present disclosure and the actual temperature.

The graph shows that the calibrated temperature output from the sample placed in the chamber, while the temperature of the chamber is continuously configured, has a difference (indicated as "Result") of about 0.2° C. from the actual temperature of the chamber (indicated as "Chamber Temp.") in some sections, but the difference is reduced from the temperature of 10° C. and eventually becomes the same as the actual temperature.

Figure 14:
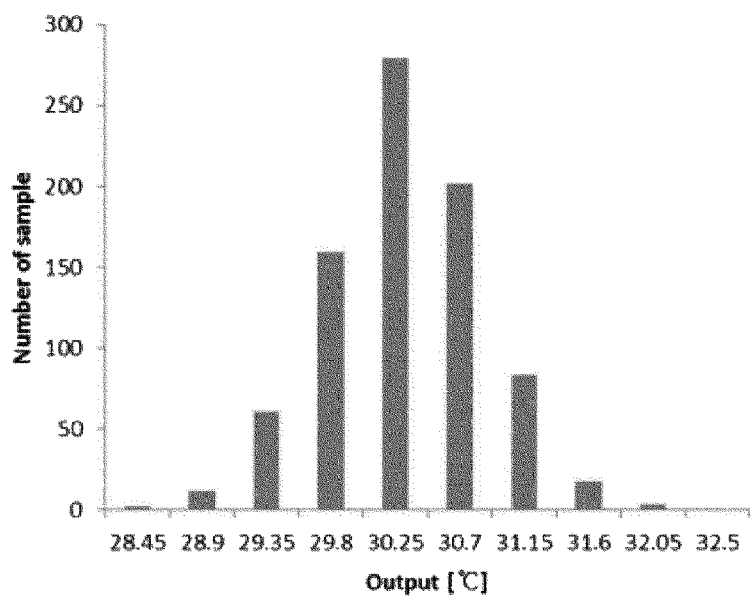
FIG. 14 is a diagram illustrating a first example showing existing temperature sensing errors.
Figure 15:
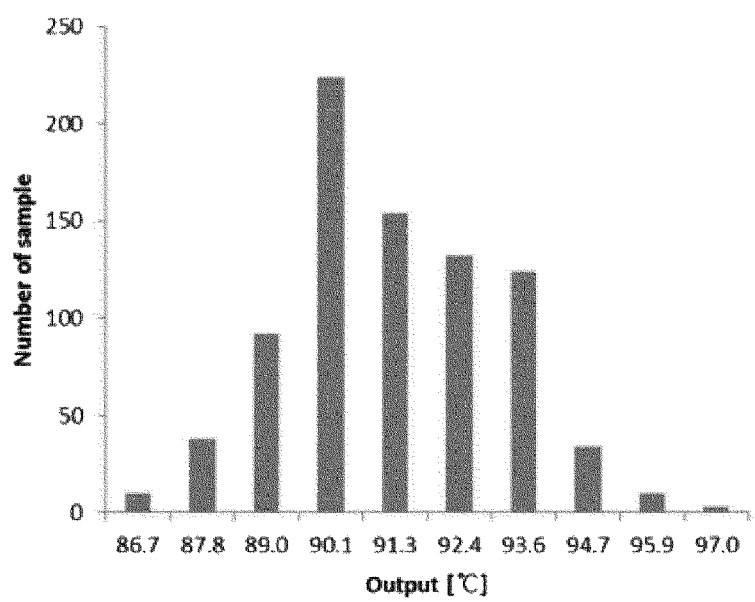
FIG. 15 is a diagram illustrating a second example showing existing temperature sensing errors.

FIG. 14 is a diagram illustrating a first example showing existing temperature sensing errors, and FIG. 15 is a diagram illustrating a second example showing existing temperature sensing errors.

FIGS. 14 and 15 illustrate graphs showing the number of samples outputting actual temperatures (indicated as "Number of samples") depending on temperatures output from a product group manufactured according to the prior art (indicated as "Output").

In the environment at the actual temperature of 30° C. in FIG. 14, the conventional products (the source driver or the display device) may output temperatures in the error range from 28° C. to 32° C. Most products output values of 29.8° C., 30.25° C., and 30.7° C., which are very far from the actual temperature of 30° C. This may show that the temperature sensing function of the prior art is relatively inaccurate.

In the environment at the actual temperature of 90° C. in FIG. 15, the conventional products (the source driver or the display device) may output temperatures in the error range from 86° C. to 97° C. Most products output values of 90.1° C., 91.3° C., 92.4° C., and 93.6° C., which are very far from the actual temperature of 90° C. This may also show that the temperature sensing function of the prior art is relatively inaccurate.

What is claimed is:

1. A source driver comprising:
   a calibrating circuit configured to differently obtain multiple pieces of temperature data and multiple pieces of voltage data corresponding to the multiple pieces of temperature data according to modes depending on power consumption of the source driver, and to generate functions between temperatures and voltages for the respective modes from the obtained multiple pieces of temperature data and the obtained multiple pieces of voltage data; and
   a data calculating circuit configured to determine the mode of the source driver, to receive input voltage data, to select a function corresponding to the mode of the source driver, and to apply the input voltage data to the selected function, thereby calculating temperature data corresponding to the input voltage data.

2. The source driver of claim 1, wherein the modes comprises a first mode for a first power consumption and a second mode for a second power consumption that is lower than the first power consumption, the source driver further comprising a memory configured to store a first group of the multiple pieces of temperature data and a first group of the multiple pieces of voltage data according to the first mode, and a second group of the multiple pieces of temperature data and a second group of the multiple pieces of voltage data according to the second mode.

3. The source driver of claim 2, wherein the calibrating circuit is configured to read out a plurality of pieces of temperature data and a plurality of pieces of voltage data from the memory according to the modes, and generate the function from the plurality of pieces of read temperature data and the plurality of pieces of read voltage data.

4. The source driver of claim 1, further comprising a memory configured to store offset data, wherein the calibrating circuit is configured to generate the function from data obtained by reflecting the offset data to the multiple pieces of voltage data.

5. The source driver of claim 4, wherein the calibrating circuit comprises a multiplexer (MUX) configured to select the plurality of pieces of voltage data or the offset data.

6. The source driver of claim 1, wherein the power consumption is determined by a refresh rate (RR) of a panel.

7. The source driver of claim 1, further comprising a temperature sensor configured to generate signals corresponding to the multiple pieces of voltage data and the input voltage data.

8. A source driver comprising:
   a calibrating circuit configured to obtain temperature data and voltage data differently according to modes depending on power consumption of the source driver, to obtain first temperature data, first voltage data corresponding to the first temperature data, second temperature data, and second voltage data corresponding to the second temperature data according to a first mode, to obtain third temperature data, third voltage data according to the third temperature data, fourth temperature data, and fourth voltage data corresponding to the fourth temperature data according to a second mode, to generate a first function between temperatures and voltages from the first temperature data, the first voltage data, the second temperature data, and the second voltage data, and to generate a second function between temperatures and voltages from the third temperature data, the third voltage data, the fourth temperature data, and the fourth voltage data; and
   a data calculating circuit configured to determine the mode of the source driver, to select a function corresponding to the mode of the source driver, and to receive fifth voltage data and calculate fifth temperature data corresponding to the fifth voltage data by applying the fifth voltage data to the selected function.

9. The source driver of claim 8, further comprising a temperature sensor configured to generate first through fifth analog signals corresponding to the first through fifth voltage data depending on temperature.

10. The source driver of claim 9, further comprising an analog-digital converter configured to digitize the first through fifth analog signals to the first through fifth voltage data.

11. The source driver of claim 8, wherein the first function is a linear function obtained by combining the first temperature data, the first voltage data, the second temperature data, and the second voltage data and the second function is a linear function obtained by combining the third temperature data, the third voltage data, the fourth temperature data, and the fourth voltage data.

12. The source driver of claim 11, wherein the calibrating circuit is configured to generate the function by adjusting a slope of the function and an offset of the function.

13. The source driver of claim 8, further comprising a memory configured to store data, wherein the calibrating circuit is configured to read out the first temperature data to the fourth temperature data and the first voltage data to the fourth voltage data from the memory.

14. A display device comprising:
   a panel; and
   a source driver, coupled to one surface of the panel, configured to receive heat from the panel, to obtain temperature data and voltage data differently according to modes depending on power consumption of the source driver, to obtain first temperature data, first voltage data corresponding to the first temperature data, second temperature data, and second voltage data corresponding to the second temperature data according to a first mode, to obtain third temperature data, third voltage data according to the third temperature data, fourth temperature data, and fourth voltage data corresponding to the fourth temperature data according to a second mode, to generate a first function between temperatures and voltages from the first temperature data, the first voltage data, the second temperature data, and the second voltage data, to generate a second function between temperatures and voltages from the third temperature data, the third voltage data, the fourth temperature data, and the fourth voltage data, to determine the mode of the source driver, to select a function corresponding to the mode of the source driver, to receive fifth voltage data, and to calculate fifth temperature data corresponding to the fifth voltage data by applying the fifth voltage data to the selected function.

15. The display device of claim 14, further comprising a heat sink plate positioned between the panel and the source driver so as to transfer heat from the panel to the source driver.

16. The display device of claim 14, wherein the fifth temperature data is a temperature of the panel.

\* \* \* \* \*